Patented Dec. 30, 1930

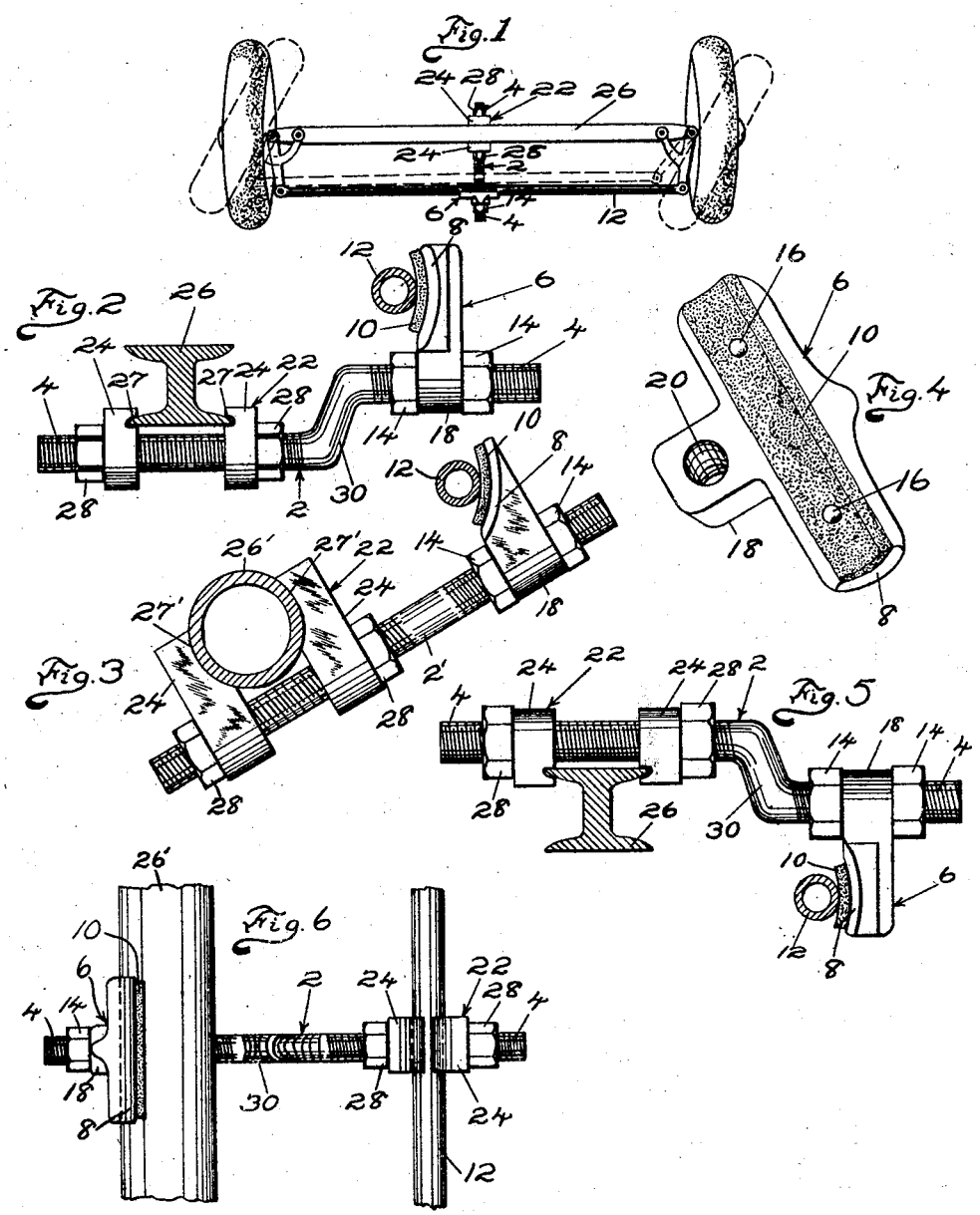

1,787,042

UNITED STATES PATENT OFFICE

NATHAN E. JOAQUIN, OF LOS ANGELES, CALIFORNIA, ASSIGNOR OF ONE-HALF TO JOHN E. STEWART, OF LOS ANGELES, CALIFORNIA

STEERING STABILIZER

Application filed January 14, 1929. Serial No. 332,253.

My invention relates to vehicles, and more particularly to a means or device adapted to be associated with the front axle and tie rod of the steering gear of said vehicle, whereby the front wheels of said vehicle may be stabilized, but at the same time permit the operation of said steering gear, without interference or binding of the same.

It accordingly is an object of my invention to provide a novel form of steering stabilizer for vehicles, in which a preferably bent rod has associated therewith a clamp or anchoring means adjustably positioned thereon, and capable of being locked on said rod, said clamp being adapted to be anchored on either the front axle of the vehicle or on the tie rod of its steering gear, said rod having also associated therewith a preferably lined pressure foot or brace adapted to engage either the axle of said vehicle or said tie rod, as desired, said stabilizer being either stationary, as when it is anchored to the axle of the vehicle, or movable, as when it is anchored to the tie rod and movable with respect to the axle of the vehicle.

The above and further objects and advantages, as will hereinafter more fully appear, I attain by the construction described in the specification and illustrated on the drawings forming a part of my application.

Reference is had to the accompanying drawings, in which similar reference characters denote similar parts. In the drawings, Fig. 1 is a top plan view of a portion of a vehicle, that is, the front axle, wheels and tie rod of the steering gear, provided with my invention, Fig. 2 is an enlarged side elevational view of the invention in situ, the axle and tie rod being shown in section, Fig. 3 is a similar view illustrating a modified form of rod and axle, Fig. 4 is an enlarged perspective view of the pressure foot, Fig. 5 is a view similar to Fig. 2, but illustrating a different adustment of the device, and Fig. 6 is a fragmentary top plan view of a modified form of the invention in which the pressure foot engages the front axle of a vehicle, and the clamp is anchored on the tie rod.

Describing my invention more in detail, it is well known that the front wheels of a vehicle, especially of the motor vehicle type, are subject to a "shimmying" action, causing annoyance and danger to the occupants of the vehicle. Numerous expedients have heretofore been proposed to remedy this objectionable feature, but so far as I am aware, none has been successful—especially by reason of the deleterious effect on the steering gear, causing the same to bind and hence making said gear difficult to operate. By the use of my invention all these difficulties are successfully overcome.

As seen in the drawings, my invention comprises a preferably bent rod 2, having two screw-threaded end portions 4, on one of which is preferably adjustably positioned the pressure foot or brace 6, desirably arcuate in shape, as indicated at 8, and provided with any preferred form of lining 10 to engage the tie rod 12, of the steering gear of the vehicle, a pair of lock nuts 14 being provided to secure the pressure foot in adjusted position. The lining 10 may be secured to the pressure foot 6 by any preferred means as the rivets 16, said pressure foot being also provided with a shank 18, having a screw-threaded opening 20 by means of which said pressure foot is positioned on and held in adjustable relation with the rod 2.

On the other end portion 4 of the rod 2 is positioned the clamp 22, which clamp comprises two jaws 24, having cut away portions 27 for engagement with, and for the purpose of anchoring the clamp on the front axle 26, a pair of lock nuts 28 being provided for locking the clamp to said axle. It will be understood, of course, that any other form of clamp or anchoring means may be substituted, and still remain within the province of my invention.

The bent or offset portion 30 is especially useful, as shown in Fig. 5, in which the tie rod 12 is normally positioned below the axle 26, thus permitting the device to be used upon all makes of cars, said device being capable of universal adjustment, both clamp and pressure foot being adapted to be positioned above or below tie rod and axle.

In use, the device is applied as shown in Fig. 1, the pressure foot 6 firmly engaging and holding the tie rod 12, thus effectively preventing any "shimmying" of the steering gear. When the steering gear and wheels are turned in either direction, the tie rod 12 moves away from the pressure foot 6, as indicated by the dotted lines in Fig. 1, thus effectively preventing any binding or interference with the steering gear.

It may be desirable in practice to dispense with the bent portion 30, and use only a straight rod, such as shown at 2', Fig. 3. Such a structure, however, has not the universal adjustability as had in the other form of my invention.

In case a round axle 26' is used, as in Figs. 3 and 6, the cut-away portions 27' are, of course, of different form than when the I beam axle 26 is used.

In Fig. 6 I have shown the clamp 22 anchored on the tie rod 12, and the pressure foot 6 engaging the axle 26'. In this case the device 2 is movable with the tie rod toward and away from said axle, the operation and construction being otherwise the same.

While I have thus described my invention with great particularity, it will be clear that the same may be modified throughout a wide range. I accordingly do not propose to be limited to the exact details of construction shown and described, but reserve the right in practice to make any and all modifications that fall within the scope of the appended claims.

I claim as my invention:

1. A vehicle steering stabilizer comprising a rotatable rod, a pressure foot adjustably associated with said rod, and adapted for rotation thereon, said pressure foot being adapted to engage one of the relatively movable members of said vehicle, and an anchoring means adjustably associated with said rod, and also rotatable thereon, and adapted to be anchored on the other of said members whereby the steering mechanism of said vehicle may be stabilized.

2. A vehicle steering stabilizer comprising a rotatable bent rod adapted for universal adjustment of said stabilizer, a pressure foot on one of the portions of said rod, and rotatable thereon, said pressure foot being adapted to engage one of the relatively movable members of said vehicle, and an anchoring device on the other portion of said rod, and said anchoring device being adapted to be anchored on the other of said members whereby the steering mechanism of said vehicle may be stabilized.

3. In a vehicle, in combination with the steering gear and front axle of said vehicle, a stabilizer for said steering gear associated with said axle and the tie rod of said steering gear, said stabilizer comprising rotatable means for stabilizing the movement of the front wheels of said vehicle, and rotatable universal adjusting means on said rod whereby said stabilizer may be adjusted universally with respect to said axle and said steering gear.

4. An article of manufacture comprising a bent rod having two screw-threaded portions, a line pressure foot on one of said portions, means for locking said pressure foot in adjustable relation with said portion, a clamp on the other of said portions, and means for locking said clamp in adjustable relation with said other portion.

5. An article of manufacture comprising a rod having an offset portion intermediate its length for universal adjustment purposes and two screw-threaded end portions, a curved pressure foot on one of said end portions, and a clamp on the other of said end portions.

In testimony whereof I have signed my name to this specification.

NATHAN E. JOAQUIN.